United States Patent
Jo et al.

(10) Patent No.: US 9,084,271 B2
(45) Date of Patent: Jul. 14, 2015

(54) FEMTO BASE STATION AND METHOD FOR MANAGING RESOURCE THEREOF

(75) Inventors: Jun-Ho Jo, Anyang-si (KR); Seo-Woo Jang, Gyeonggi-Do (KR); Jae-Won Lim, Anyang-si (KR); Byoung-Hoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 810 days.

(21) Appl. No.: 13/381,640

(22) PCT Filed: Jun. 30, 2009

(86) PCT No.: PCT/KR2009/003564
§ 371 (c)(1),
(2), (4) Date: Apr. 13, 2012

(87) PCT Pub. No.: WO2011/002115
PCT Pub. Date: Jan. 6, 2011

(65) Prior Publication Data
US 2012/0190374 A1 Jul. 26, 2012

(51) Int. Cl.
*H04W 72/00* (2009.01)
*H04W 72/08* (2009.01)
*H04W 84/04* (2009.01)

(52) U.S. Cl.
CPC .......... *H04W 72/085* (2013.01); *H04W 84/045* (2013.01)

(58) Field of Classification Search
CPC . H04W 52/244; H04W 52/40; H04W 84/045; H04W 16/16; H04W 36/04; H04W 52/143; H04W 52/245; H04W 36/30; H04W 52/325; H04W 72/0406; H04W 16/06; H04W 36/0061; H04W 36/08; H04W 52/146; H04W 52/283; H04W 52/343; H04W 52/346; H04W 72/04; H04W 72/085; H04L 5/0048; H04J 11/0093; Y02B 60/50
USPC .................................................. 455/436–454
See application file for complete search history.

(56) References Cited

U.S. PATENT DOCUMENTS

| | | | |
|---|---|---|---|
| 6,138,024 A | 10/2000 | Evans et al. | |
| 7,088,959 B2 * | 8/2006 | Ho et al. | 455/69 |
| 8,755,800 B2 * | 6/2014 | Yoon et al. | 455/436 |
| 8,812,049 B2 * | 8/2014 | Brisebois et al. | 455/522 |
| 2008/0085720 A1 | 4/2008 | Hirano et al. | |
| 2008/0108353 A1 * | 5/2008 | Lee et al. | 455/437 |
| 2009/0042593 A1 * | 2/2009 | Yavuz et al. | 455/522 |
| 2009/0042594 A1 * | 2/2009 | Yavuz et al. | 455/522 |
| 2009/0042595 A1 * | 2/2009 | Yavuz et al. | 455/522 |
| 2009/0042596 A1 * | 2/2009 | Yavuz et al. | 455/522 |
| 2009/0109939 A1 * | 4/2009 | Bhushan et al. | 370/337 |
| 2009/0131049 A1 * | 5/2009 | Osborn | 455/435.1 |
| 2010/0240373 A1 * | 9/2010 | Ji et al. | 455/436 |
| 2011/0306346 A1 * | 12/2011 | Yoon et al. | 455/437 |
| 2012/0190374 A1 * | 7/2012 | Jo et al. | 455/450 |
| 2014/0080499 A1 * | 3/2014 | Brisebois et al. | 455/452.1 |

* cited by examiner

*Primary Examiner* — Matthew Sams
(74) *Attorney, Agent, or Firm* — Lee, Hong, Degerman, Kang & Waimey

(57) ABSTRACT

A method for managing radio resource of a femto cell includes: providing, by the femto cell, a service to one or more UEs by using most of pre-set radio resource; receiving measurement results from the one or more UEs; determining whether or not one or more neighbor femto cells are closely located nearby based on the measurement results; and if it is determined that neighbor femto cells are closely located nearby, reducing the pre-set radio resource into a small radio resource and providing a service with the small radio resource.

13 Claims, 14 Drawing Sheets

Fig. 6
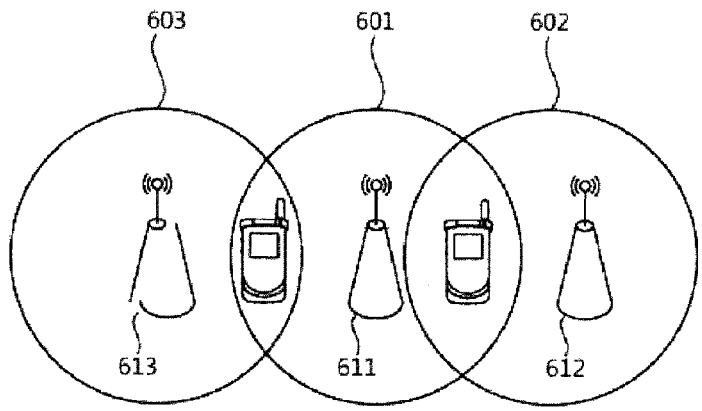
[Fig. 7]
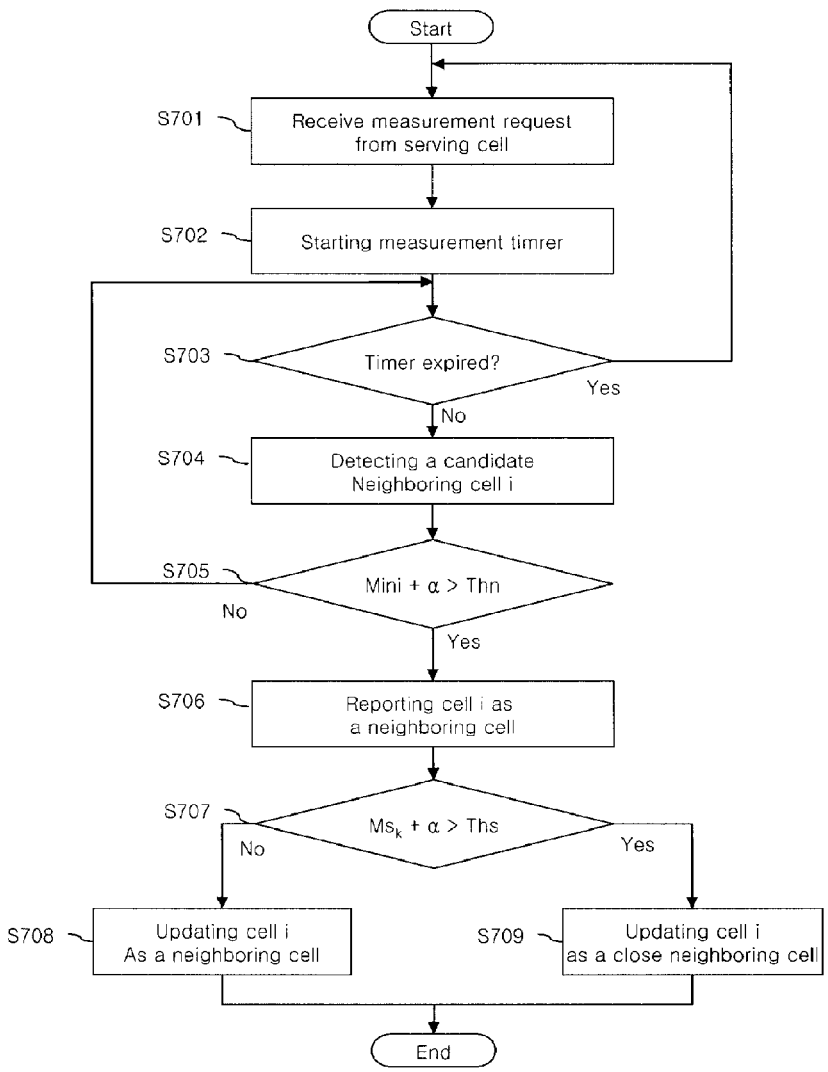

Fig. 13
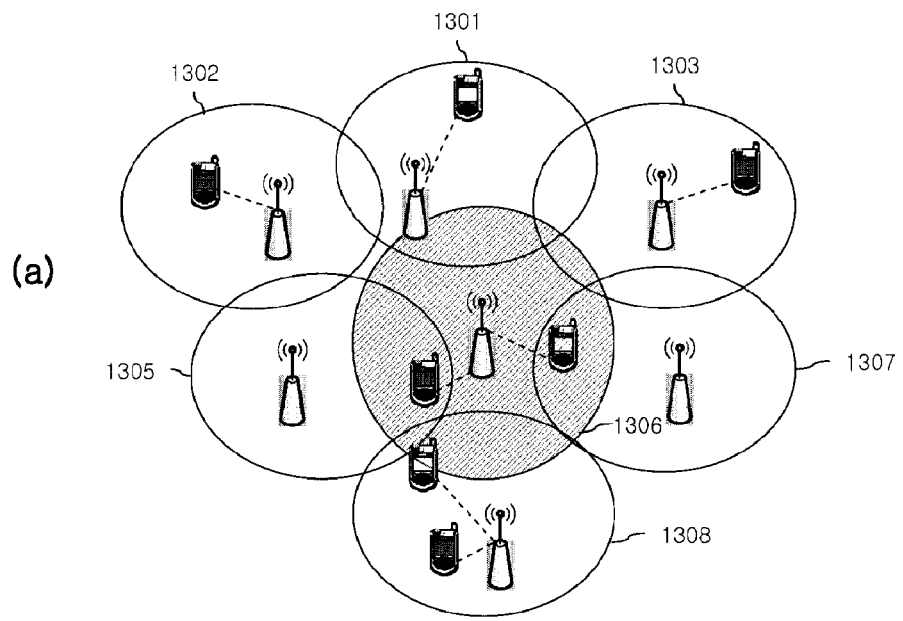
(a)
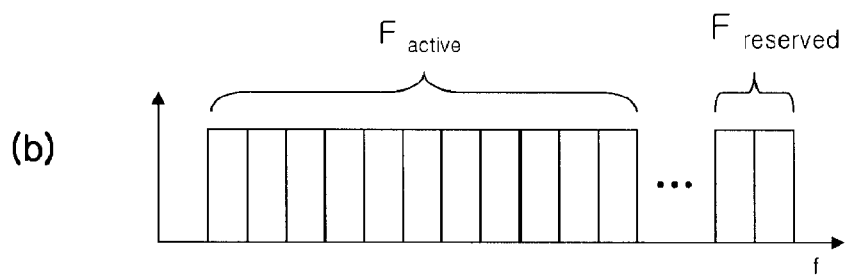
(b)

FEMTO BASE STATION AND METHOD FOR MANAGING RESOURCE THEREOF

CROSS-REFERENCE TO RELATED APPLICATIONS

This application is the National Stage filing under 35 U.S.C. 371 of International Application No. PCT/KR2009/003564, filed on Jun. 30, 2009, the contents of which are all incorporated by reference herein in its entirety.

TECHNICAL FIELD

The present invention relates to a mobile communication system and, more particularly, to a femto base station in a mobile communication system and a method for managing resource thereof.

BACKGROUND ART

The $2^{nd}$-generation mobile communication refers to transmission/reception voice data in a digital manner, which includes CDMA, GSM, and the like. As an advanced level of GSM, GPRS has been proposed to provide a packet switched data service based on the GSM system.

The $3^{rd}$-generation mobile communication refers to a scheme for transmitting and receiving image and data. A Third Generation Partnership Project (3GPP) has developed a mobile communication system (IMT-2000) and adopts WCDMA as a radio access technology (RAT). A scheme combining the IMT-2000 technology and the RAT, e.g., the WCDMA, is called universal mobile telecommunication system (UMTS). A UTRAN stands for a UMTS terrestrial radio access network.

The $3^{rd}$-generation mobile communication is evolving into $4^{th}$-generation mobile communication.

As the $4^{th}$-generation mobile communication technology, a long-term evolution network (LTE) technique under standardization by 3GPP and an IEEE 802.16 technique under standardization by IEEE have been proposed. The LTE uses a term of an evolved-UTRAN (E-UTRAN).

For the $4^{th}$-generation mobile communication technology, an orthogonal frequency division multiplexing (OFDM)/orthogonal frequency division multiple access (OFDMA) have been introduced. OFDM uses orthogonality between inverse fast Fourier transform (IFFT) and fast Fourier transform (FFT). A transmitter performs IFFT on data and transmits the same. A receiver performs FFT on a reception signal to restore the original data. The transmitter uses IFFT to combine a plurality of sub-carriers, and the receiver uses corresponding FFT to separate the plurality of sub-carriers.

Meanwhile, in the $3^{rd}$ or $4^{th}$-generation mobile communication system, attempts for increasing a cell capacity continues to support high capacity services such as multimedia contents, streaming, and the like, and bi-directional services.

An approach of using a high frequency band and reducing a cell radius has been proposed to increase the cell capacity. The application of a cell with a relatively small cell radius such as a pico cell or the like can use a higher band than the frequency band used in the existing cellular system, having an advantage that more information can be transmitted, but also there is shortcomings in that more base stations should be installed in the same area, incurring more costs.

As one of approaches for increasing the cell capacity by using smaller cells, a femto cell has been proposed.

A femto cell refers to providing a small radio environment by installing a very small base station with low power consumption at homes or offices. The femto cell can enhance quality of service (QoS) by improving an indoor service available area and increasing capacity, and is expected to completely settle the next generation mobile communication system by providing data services.

In this respect, however, the reduction in the cell radius may lead to dense base stations in a particular area, and because of unnecessary overlap installations of base stations, interference is generated, radio resources are ineffectively used, and a system performance is degraded.

In particular, in the femto cell cellular system, a femto base station (femto BS) can be arbitrarily installed by a user, and such installation of femto BSs possibly causes an overcrowded femto BSs.

In the related art as described above, an installation position of an femto BS is selected by each user, and the femto BS has a smaller coverage compared with a macro-base station and provides a service to a smaller number of determined users.

Thus, the location distribution of users much affect the interference relationship between femto BSs. Unnecessary overlap installations and overcrowded installations may be caused, and in a residual area or offices are crowded, the distance between installed femto base stations is narrow.

DISCLOSURE OF INVENTION

Technical Solution

Therefore, an object of the present invention is to reduce the overcrowded phenomenon of femto base stations and interference between cells of a femto base station.

Another object of the present invention is to continuously provide a satisfied level of quality of service (QoS) to terminals (i.e., user equipments (UEs)), restrain interference, and effectively use radio resources.

To achieve these and other advantages and in accordance with the purpose of the present invention, as embodied and broadly described herein, there is provided a method for managing radio resource of a femto cell, including: providing, by the femto cell, a service to one or more UEs by using most of pre-set radio resource; receiving measurement results from the one or more UEs; determining whether or not one or more neighbor femto cells are closely located nearby based on the measurement results; and if it is determined that neighbor femto cells are closely located nearby, reducing the pre-set radio resource into a small radio resource and providing a service with the small radio resource.

The measurement results may include one or more of the cell measurement results with respect to the neighbor femto cells, signal-to-interference noise ratio (SINR), a channel quality indicator (CQI), and a sounding reference signal (SRS).

In determining whether or not one or more neighbor femto cells are closely located nearby, if a channel state of the UE becomes worse than a pre-set threshold value, it is determined that the neighbor femto cells are closely located nearby.

The determining whether or not one or more neighbor femto cells are closely located nearby may include: determining whether or not the neighboring cells are close neighboring cells based on the measurement results; calculating a ratio of the close neighboring cells to the whole neighboring cells; and if the ratio exceeds a pre-set threshold value, determining that the neighbor femto cells are closely located nearby.

The reducing of the pre-set radio resource may include: handing over one or more UEs to the neighbor femto cells.

The reducing of the pre-set radio resource may include: providing a service via a first resource among the small radio resource; and if the first radio resource is interfered with by a neighboring cell, providing second radio resource among the small radio resource.

The method for managing radio resource of a femto cell may further include: if an interference with the neighbor femto cells that are closely located is reduced, extending the small radio resource to the pre-set radio resource to provide a service.

The extending of the small radio resource may include: determining whether or not there are UEs which have been connected for more than a pre-set time period in the femto cell; determining whether or not there is a UE whose signal-to-interference noise ratio (SINR) increases or decreases in excess of a pre-set threshold value, among the UEs which have been connected for more than the pre-set time period; and providing a service to a UE whose SINR does not exceed the threshold value, among the UEs which have been connected for more than the pre-set time period, by using the entirety of the pre-set radio resource.

The method for managing radio resource of a femto cell may further include: providing a service to one or more of a UE which has not been connected for more than the pre-set time period and a UE whose SINR exceeds the threshold value by using the small radio resource.

To achieve these and other advantages and in accordance with the purpose of the present invention, as embodied and broadly described herein, there is also provided a method for managing radio resource of a femto cell, including: if a neighboring cell operates in a minimal mode, determining whether or not there are UEs which have been connected for more than a pre-set time period in the femto cell; determining whether or not there is a UE whose signal-to-interference noise ratio (SINR) increases or decreases in excess of a pre-set threshold value, among the UEs which have been connected for more than the pre-set time period; and providing a service to a UE whose SINR does not exceed the threshold value, among the UEs which have been connected for more than the pre-set time period, by using the entirety of the pre-set radio resource.

According to the present invention, an overcrowded phenomenon of femto base stations or interference between cells of femto base stations can be reduced. Also, a satisfied level of QoS can be provided to UEs, an interference can be restrained, and radio resources can be more effectively used.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 contrastively illustrates a neighboring cells and a close neighboring cell discriminated in a handover method according to an exemplary embodiment of the present invention;

FIG. 7 is a flow chart illustrating the process of detecting, by a base station, a close neighboring cell;

FIG. 13 illustrates a resource reducing method of a femto cell according to one exemplary embodiment of the present invention;

MODE FOR THE INVENTION

Figure 1:
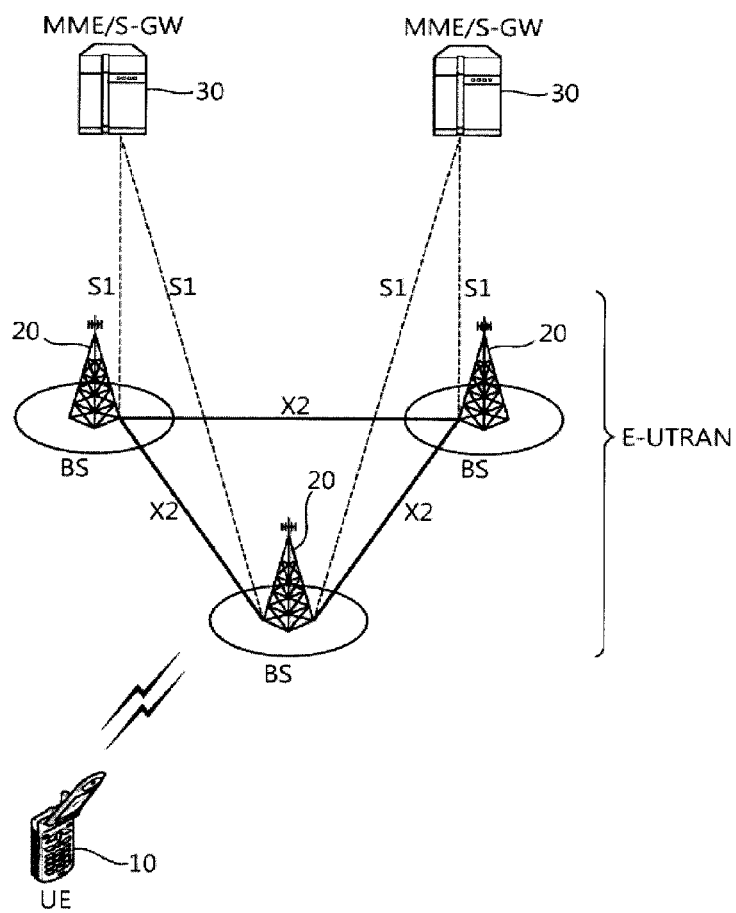
FIG. 1 illustrates a wireless communication system.

Reference will now be made in detail to the preferred embodiments of the present invention, examples of which are illustrated in the accompanying drawings.

The present invention is applied to a femto cell, Home-Node B, or Home-eNode B (Home evolved Node B). However, without being limited thereto, the present invention can be applicable to any communication systems and methods to which the technical idea of the present invention is applied.

The technical terms in the description of the present invention are used for explaining particular embodiments and it should be understood that they do not limit the present invention. Unless otherwise defined, all terms used herein have the same meanings as those generally understood by those with ordinary knowledge in the field of art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present application. Also, if a technical term used in the description of the present invention is an erroneous term that fails to clearly express the idea of the present invention, it should be replaced by a technical term that can be properly understood by the skilled person in the art. In addition, general term used in the description of the present invention should be construed according to definitions in dictionaries or according to its front or rear context, and should not be construed to have an excessively restrained meaning.

The terms "a" and "an" are defined as one or more unless explicitly stated otherwise herein. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, it can be directly connected with the other element or intervening elements may also be present. In contrast, when an element is referred to as being "directly connected with" another element, there are no intervening elements present.

Embodiments of the present invention will be described below in detail with reference to the accompanying drawings, where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

The term of terminal is in use, but the terminal may be also called user equipment (UE), mobile equipment (ME), or mobile station (MS). In addition, the UE may be a mobile device having a communication function such as mobile phones, personal digital assistants (PDAs), smart phones, notebook computers, and the like, or may be a device that cannot be carried around such as personal computers (PCs) or a vehicle-mounted device.

The exemplary embodiments of the present invention will now be described in detail with reference to the accompanying drawings.

FIG. 1 illustrates a wireless communication system. The wireless communication system illustrated in FIG. 1 may have a network structure of an evolved-universal mobile telecommunications system (E-UMTS). The E-UMTS system may be a long terminal evolution (LTE) system. The wireless communication system is widely deployed to provide a variety of communication services such as communication of voice, packet data, etc.

With reference to FIG. 1, the E-UTRAN includes base stations (BSs) 20 each providing a control plane and a user plane.

A user equipment (UE) 10 may be fixed or mobile, and may be referred to by other names such as mobile station (MS), user terminal (UT), subscriber station (SS), wireless device, etc. The BS 20 generally refers to a fixed station that communicates with the UE 10 and may be called by other names such as evolved-node-B (eNB), base transceiver system (BTS), access point (AP), etc.

A single BS 20 may provide a service with respect to at least one cell. A cell is an area to which the BS 20 provides a communication service. An interface for transmitting user traffic or control traffic may be used between BSs 20. Hereinbelow, downlink refers to communication from the BSs 20 to the UE 10, and uplink refers to communication from the UE 10 to the BSs 20.

The BSs 20 may be connected via an X2 interface. The BSs 20 are connected to evolved packet cores (EPCs), specifically, to mobility management entity (MME)/serving gateways (S-GWs) 30, via S1 interfaces. The S1 interfaces support many-to-many relations between the BSs 20 and the MME/S-GWs 30.

Figure 2:
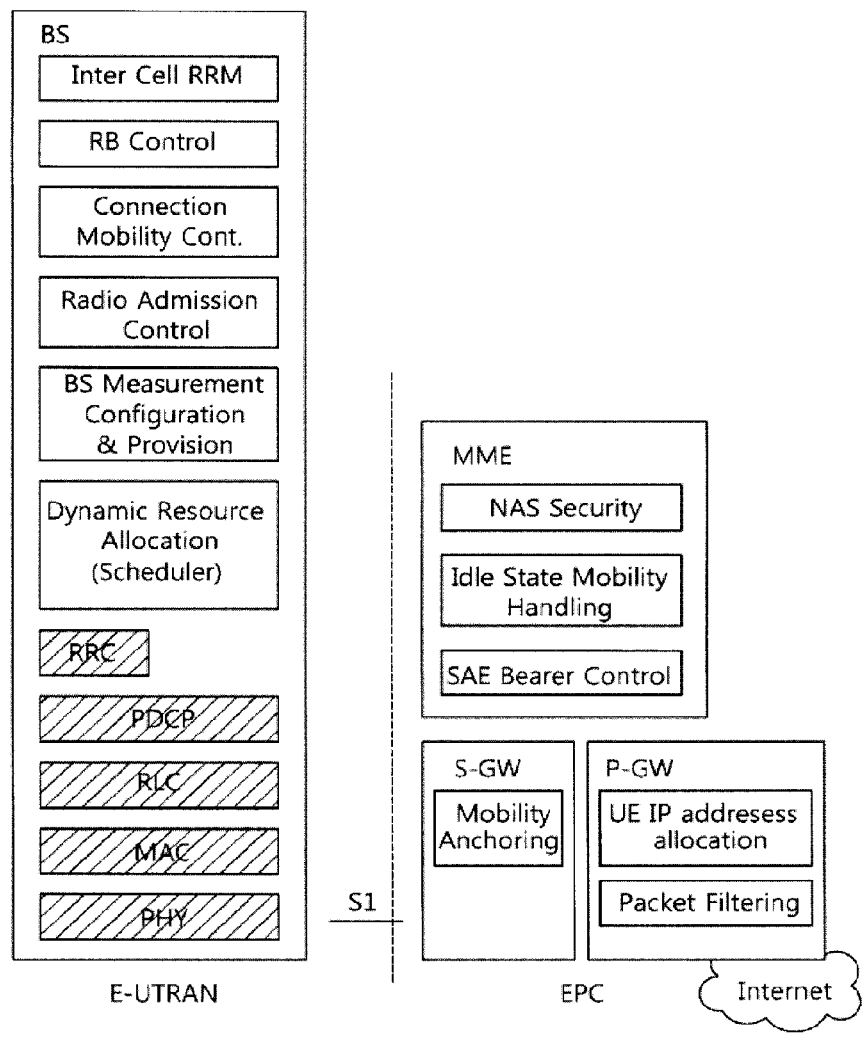
FIG. 2 is a schematic block diagram illustrating a functional split between an E-UTRAN and an EPC.

FIG. 2 is a schematic block diagram illustrating a functional split between an E-UTRAN and an EPC. The shaded boxes indicate radio protocol layers, and non-shaded boxes indicate functional entities of the control plane.

With reference to FIG. 2, the BSs perform the following functions: (1) a radio resource management (RRM) function such as radio bearer control, radio admission control, connection mobility control, dynamic resource allocation to UEs, and the like; (2) Internet protocol (IP) header compression and encryption of a user data stream; (3) routing of user plane data to S-GW; (4) scheduling and transmission of a paging message; (5) scheduling and transmission of broadcast information; and (6) measurement for mobility and scheduling and setting a measurement report.

An MME performs the following functions: (1) non-access stratum (NAS) signaling; (2) NAS signaling security; (3) idle mode UE reachability; (4) tracking area list management; (5) roaming; (6); authentication.

An S-GW performs the following functions: (1) mobility anchoring; (2) lawful interception.

A P-GW performs the following functions: (1) UE Internet protocol (IP) allocation; (2) packet filtering.

Figure 3:
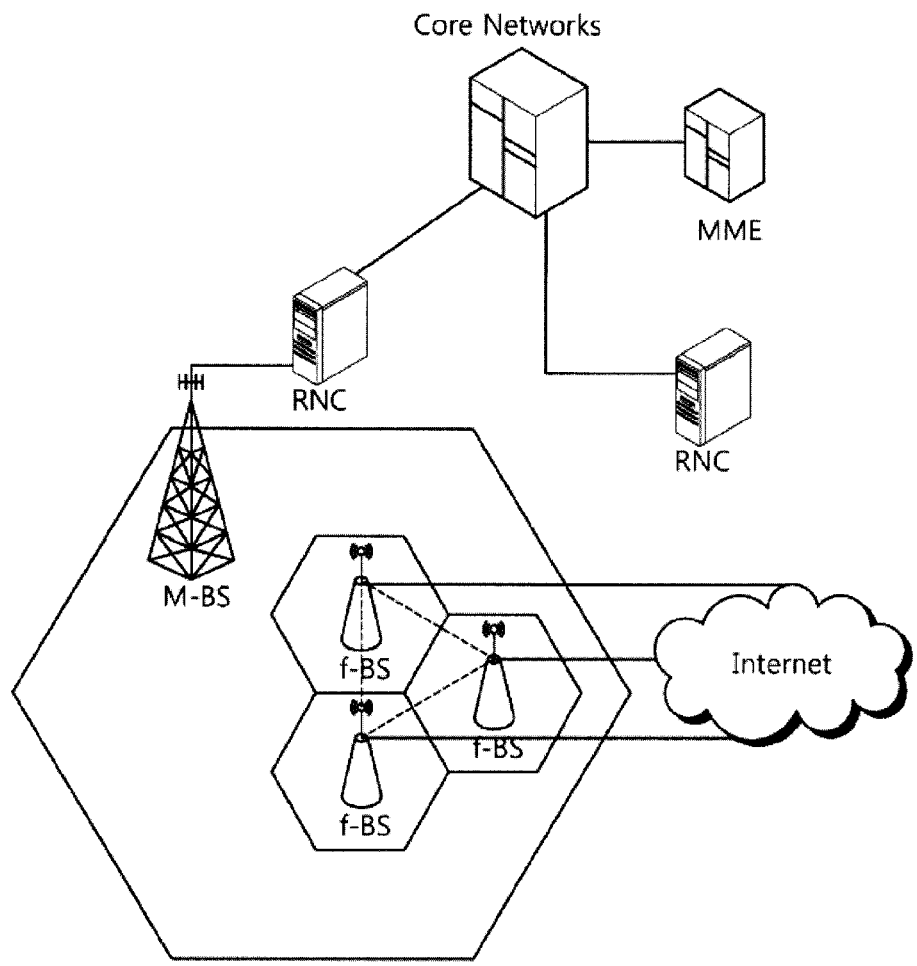
FIGS. 3 and 4 illustrate a femto cell system.
Figure 4:
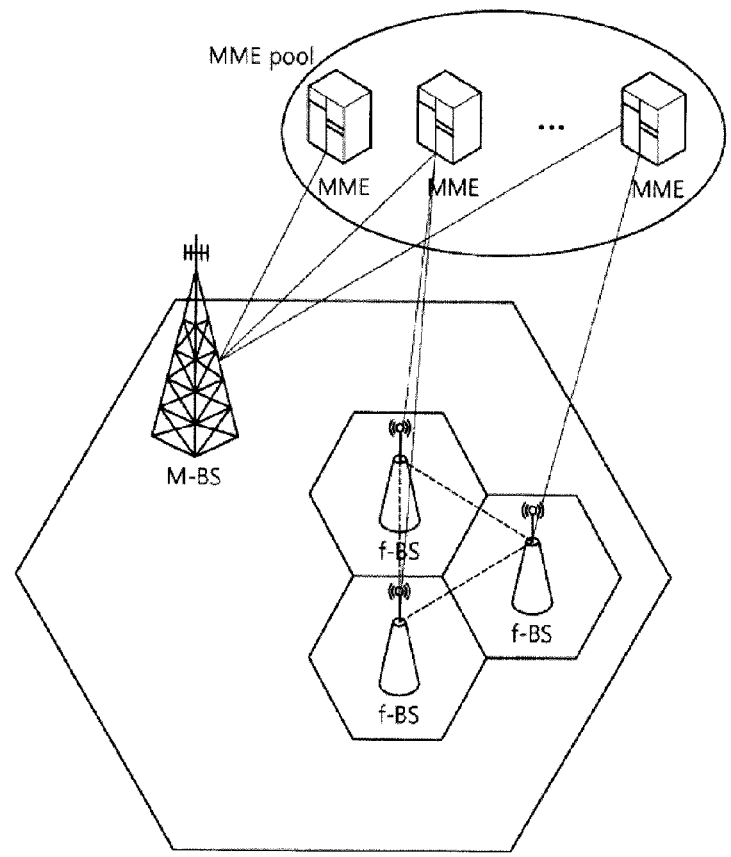

FIGS. 3 and 4 illustrate a femto cell system.

A handover method according to an exemplary embodiment of the present invention includes a general multi-cell environment, which, thus, can be applicable to a femto cell cellular system including femto base stations (femto BSs), small base stations, which are closely distributed as users installs them, respectively, in a particular area, and user equipments (UEs).

The femto cell cellular system may include a macro base station (M-BS) providing a wide coverage and a plurality of femto cell base stations (femto BSs) installed base on users. As shown in FIG. 3, the femto BSs and a core network may be connected via a femto cell network controller (FNC). The femto BSs may be connected to the M-BS via the FNC, the core network and a radio network controller (RNC). Or, as shown in FIG. 4, the femto BSs may be directly connected to an MME in an MME pool so as to be connected to the core network.

Each femto BS is connected to the FNC via the Internet to provide a service to previously registered limited users (i.e., a closed subscriber group (CSG)) under the control of the FNC. UEs measure signals of neighboring cells and transfers the same to an femto BS corresponding to its serving femto BS. The femto BS recognizes and manages the presence of a neighboring cell by using the cell measurement result received from the UE.

The femto BSs exchange information via a direct link or an indirect link by way of the FNC. The M-BSs may exchange information via the FNC, the RNC or the MME.

Because the femto BSs are installed by users, they may be unnecessarily installed in an overlap manner within a narrow area or closely installed. In particular, in a residence area or in an office crowded area, the space between femto BSs is narrow, resulting in that service coverage of the femto BSs overlaps. Then, interference occurs between the femto cell cellular systems using radio resources of the same frequency band, and the system capacity is reduced.

In this respect, however, if the central FNC performs controlling on the crowded femto BSs, because it must control numerous femto BSs, increasing the operation costs, and the controlling is very complicated to result in an ineffective operation of the system.

Figure 5:
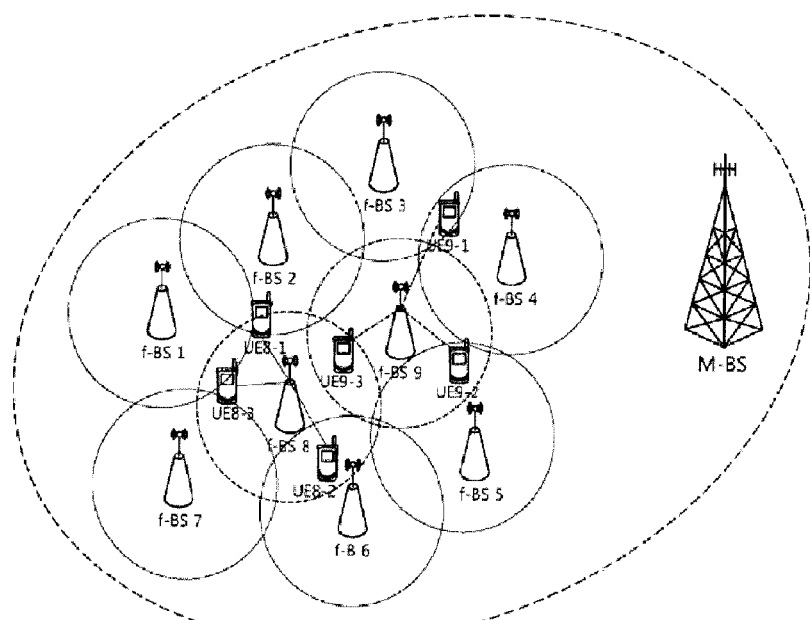
FIG. 5 illustrates base station-crowded area.

FIG. 5 illustrates base station-crowded area.

In FIG. 5, a femto cell cellular system including femto BSs, an M-BS, and UEs is illustrated. With reference to FIG. 5, it is noted that there are many overlapping areas between cells.

In case of a general BS including the mentioned M-BS, if its installation space is too close more than necessary, a base station crowded phenomenon may occur. In particular, in the femto cell cellular system installed based on users, BSs may be installed to unnecessarily overlap with each other or overcrowded. Such phenomenon becomes severe in case of a resistance/office crowded area.

Thus, service coverage of several BSs may overlap to cause an interference in the femto cell cellular system using the radio resources of the same frequency band and the like, resulting in an reduction in the system capacity and the use efficiency of the radio resources.

The coverage of the most femto BSs shown in FIG. 5 overlaps, and among them, in case of the femto BS 8 and the femto BS 9, their coverage overlaps widely. In addition, the UE8-1, UE8-2, UE8-3, UE9-1, UE9-2, and UE9-3 within the coverage of the femto BS 8 and the femto BS 9 are located at an overlap area with the coverage of the femto BS 2 and the femto BS 7.

There would be no problem for the UEs to receive a service even if one of the femto BS 8 and the femto BS 9 is absent, so the femto BSs do not need to be closely located as shown in FIG. 5. Such crowded locations of the femto BSs merely make the interference between cells amplified.

The femto BS 1 to femto BS 9 are common in that they are all distributed in the BS-crowded area, and cells covered by each BS are all neighboring cells. In this respect, among the neighboring cells, the particularly close neighboring cells may be sort out, and those particularly close neighboring cells will be referred to as close neighboring cells hereinafter.

In order to improve the ineffective use of the radio resources and degradation of the system performance due to interference generated by unnecessary overlapping installations of the femto BSs, the present invention provides a method for allowing a femto BS to detect that the femto BS itself is present in an overcrowded area (which is called self-organized detecting) without a help of a central controller such as the FNC, and resolve such crowded phenomenon.

For example, a BS may hand over a UE to a neighboring cell nearby within its coverage, and reduces itself to thus reduce interference with respect to neighboring cells.

FIG. 6 contrastively illustrates a neighboring cell and a close neighboring cell discriminated in a handover method according to an exemplary embodiment of the present invention.

Specifically, FIG. 6 shows femto cell 1 601, a femto cell 2 602, and a femto cell 3 603 which overlap with each other. A serving femto cell of UEs is the femto cell 1 601, and the femto cell 2 602 and the femto cell 3 603 are neighboring femto cells of the serving femto cell 1 601. the femto cell 2 602 overlaps with the femto cell 1 601 in a wider area than the femto cell 3 603 does with the femto cell 1, and as for the distance between BSs of the cells, it is noted that the femto BS 611 of the femto cell 1 601 and the femto BS 612 of the femto cell 2 602 are closer than the femto BS 611 of the femto cell 1 601 and the femto BS 613 of the femto cell 3 603.

In this case, the femto cell 3 603 may be a neighboring cell of the femto cell 1 601, and the femto cell 2 602 may be a close neighboring cell of the femto cell 1 601. If there are more than a certain amount of close neighboring femto cells nearby, or if a ratio of close neighboring femto cells to neighboring femto cells is more than a certain value, the femto BS recognizes that it is located in an overcrowded area and the femto BS or the UE may\use the handover method according to an exemplary embodiment of the present invention.

In order to discriminate a close neighboring femto cell from among the neighboring femto cells, a cell measurement method using a reference signal may be employed. A substantial reference or method for discriminating a close neighboring cell will now be described.

FIG. 7 is a flow chart illustrating the process of detecting, by a base station, a close neighboring cell. A neighboring femto cell may be first detected and close neighboring femto cell may be then detected.

The UE receives a cell measurement request from the BS (S701). According to the cell measurement request, the UE performs cell measurement on other femto cells around the serving femto cell.

Of course, although there is no cell measurement request from the femto BS, the UE may perform cell measurement according to a predetermined factor such as an interference level, a certain period, or the like.

To start cell measurement, a measurement timer starts (S702). Until before the measurement timer expires (S703), the UE can detect a candidate femto cell i (704). The UE compares the strength of a reference signal with respect to the candidate femto cell i and a threshold value (Thn) of a neighboring femto cell (S705). Namely, the UE determines whether a value (Mni+α) obtained by adding an offset value (α) to Mni indicating the strength of the reference signal between the candidate cell i and the UE is larger than the threshold value.

If the value (Mni+α) obtained by adding the reference signal strength and the offset value is larger than the threshold value of the neighboring femto cell, the candidate femto cell i is classified as a neighboring femto cell. The UE may report the candidate femto cell i as a neighboring femto cell to the BS (S706).

If the value (Mni+α) is smaller than the threshold value and the measurement timer has not expired yet, the UE detects another candidate femto cell and performs cell measurement to determine whether the candidate femto cell is a neighboring femto cell.

When the measurement timer expires, the UE waits for receiving a new cell measurement request, and when the UE receives a cell measurement request from the BS, the UE may perform cell measurement according to the request.

In this manner, the UE determines whether neighboring femto cells are close neighboring femto cells (S707).

If the sum of the value (Msk) indicating the strength of a reference signal between the UE and the BS of the current serving femto cell and an offset value α' differently set from a previous offset value is larger than a threshold value Ths, the corresponding neighboring femto cell i is determined to be a close neighboring femto cell.

That is, the neighboring cell i that satisfies the condition of Msk+α'>Ths as well as satisfying the condition of Mni+α'Thn is a close neighboring femto cell (S708).

If a neighboring femto cell i that does not satisfy the condition of Msk+α'>Ths is registered as a neighboring femto cell as it is (S709). α and α' may be values that can be differently set for each system according to how wide the range of a close neighboring femto cell is to be admitted or in consideration of radio environments in which a base station and a UE are exposed.

The femto cell i determined as the close neighboring femto cell may be registered on a close neighboring femto cell list.

Determination of neighboring femto cell: [Mni+α'>Thn]

Determination of close neighboring cell: [Mni+α'>Thn] and [Msk+α'>Ths]

Namely, if the strength of the reference signal between the UE and the femto cell i is stronger than a first threshold value and, at the same time, if the strength of the reference signal between the UE and the serving femto cell is stronger than a second threshold value, the femto cell i can be a neighboring femto cell and close neighbor. Here, the first and second threshold values may be previously set at the UE or BS.

At this time, the neighboring femto cell list or the close neighboring femto cell list are collectively (integratedly) managed by the BS, rather than indicating the individual relationship between each UE and each neighboring femto cell.

Accordingly, if two or more UEs report repeated or the different results on the same femto cell, the BS may process the neighboring femto cell list or the close neighboring femto cell list as follows.

When UE1 and UE2 report a cell i as a neighboring femto cell, if the both UEs report the cell i not as a close neighboring cell and the cell i has never been determined as a neighboring femto cell or a close neighboring femto cell, the BS registers the cell i on the neighboring femto cell list only one time. If the cell i has already been determined as a neighboring femto cell, the BS does not update the neighboring femto cell list.

When the UE1 and UE2 report that the cell i as a neighboring femto cell or a close neighboring femto cell, if the femto cell i has not bee registered yet as a close neighboring femto cell, the BS registers the cell i on the close neighboring femto cell list. If the cell i has been already registered as a close neighboring femto cell, the BS does not update the list. If the cell i has been registered only as a neighboring femto cell, the BS registers the cell i as a close neighboring femto cell.

If the UE1 and UE2 make different report, for example, if the UE1 reports the cell i as a neighboring femto cell while the UE2 reports the cell i as a close neighboring femto cell, the BS registers the femto cell i as a close neighboring femto cell to the list. If the cell i has been already registered as a close neighboring femto cell, the BS does not update the list, and if the cell i has been registered only as a neighboring femto cell, the BS updates the list by changing the cell i as a close neighboring femto cell.

In the list, cells are included as a neighboring femto cell or a close neighboring femto cell only one time, and even if a repeated report is made, one cell is registered only one time. If there is one report that the same cell is a close neighboring femto cell through a previous record or according to another report, the cell is registered as a close neighboring femto cell.

Figure 8:
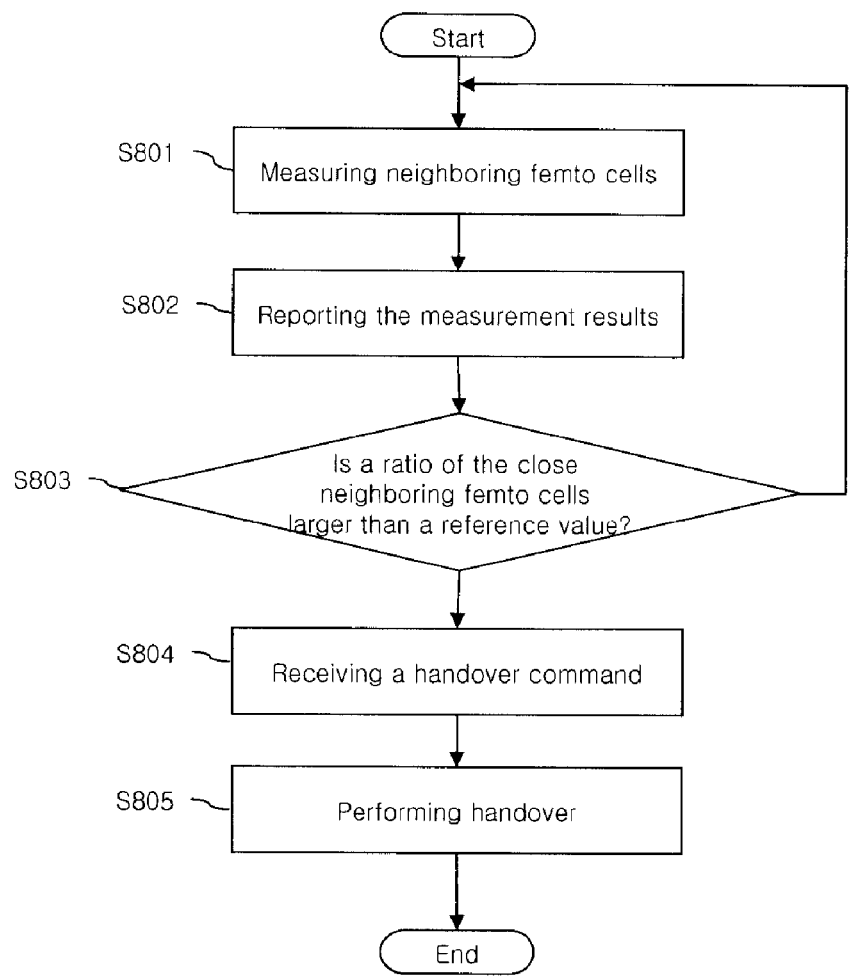
FIG. 8 is a flow chart illustrating the process of performing handover by a UE according to one exemplary embodiment of the present invention.

FIG. 8 is a flow chart illustrating the process of performing handover by a UE according to one exemplary embodiment of the present invention.

A UE performs cell measurement on neighboring femto cells (S801). The cell measurement may be performed by measuring the strength of a reference signal. The UE reports the cell measurement result to its serving femto BS (S802).

When the UE measures the strength of the reference signal and reports only the result to the serving femto BS, the serving femto BS can determine whether a neighboring femto cell, a subject of the measurement, is a close neighboring femto cell according to the strength level of the reference signal.

Of, the UE may determine whether or not the strength of the reference signal is stronger than a certain value or whether or not the neighboring femto cell, the subject of the cell measurement, is a close neighboring femto cell, include the determination result in the cell measurement result and report the same to the serving femto BS.

The serving femto BS may recognize whether or not the neighboring femto cells are close neighboring femto cells, or a ratio of the close neighboring femto cells to the entire neighboring femto cells if the neighboring femto cells are close neighboring femto cells, according to the cell measurement result received from the UE.

Here, it is determined whether or not the ratio of the close neighboring femto cells is larger than a reference value (S803).

If a value Rci indicating the ratio of the cells determined as the close neighboring femto cells among the entire neighboring femto cells is larger than a threshold value ThRc, the corresponding femto BS determines that the BS itself is within an overcrowded area. The ThRc is a threshold value of the radio of the close neighboring femto cell for requesting handover of a UE from a neighboring femto cell or a close neighboring femto cell.

When the Rci is larger than the threshold value ThRc, it means that the ratio of the close neighboring femto cells is excessively large, determining that the corresponding femto BS is within in the overcrowded area. In this case, because the corresponding femto BS is closed to neighboring femto BSs, causing an interference. Thus, in this situation, the BSs may attempt handover or the like to reduce the amount of interference.

Namely, if the ratio of the neighboring femto cells discriminated as close neighboring femto cells is larger than the reference value, the BS is determine that it is in the overcrowded area and commands the UE to perform handover.

Then, the UE receives the handover command from the BS (S804) and performs handover to a cell of the macro BS or a cell of a neighboring femto BS (S805). After the UE performs handover to a target cell, the serving femto BS retrieves radio resource it has allocated to the UE and reduces its entire radio resource.

Figure 9:
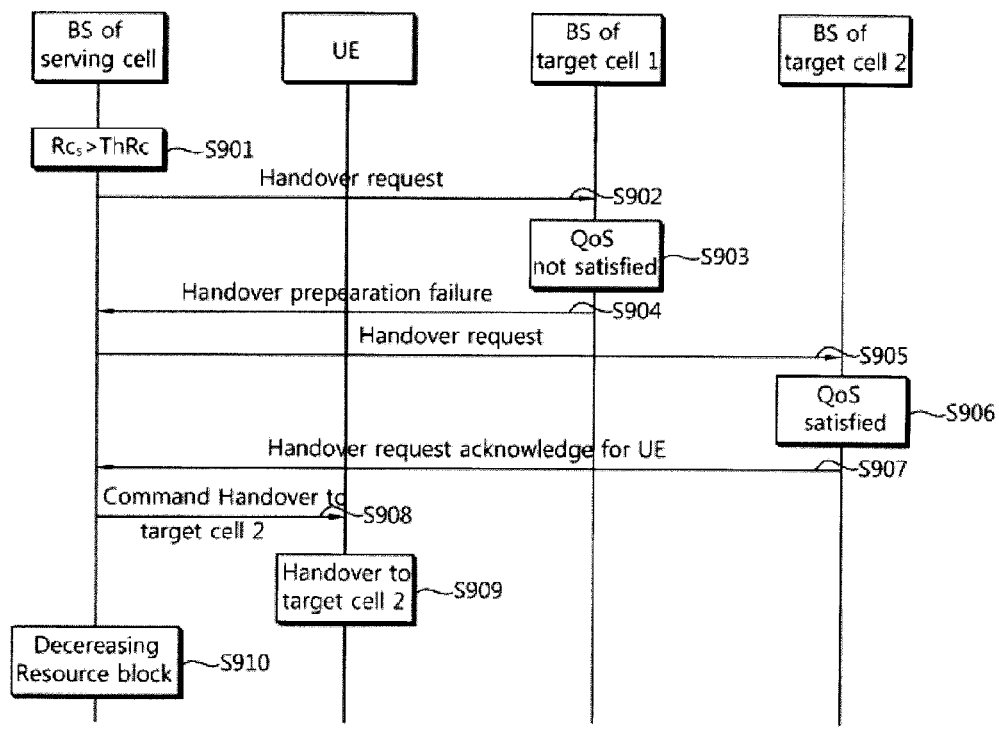
FIG. 9 illustrates the process of performing handover according to another exemplary embodiment of the present invention.

FIG. 9 illustrates the process of performing handover according to another exemplary embodiment of the present invention.

The process of performing handover by the serving femto BS to a different femto BS through direct communication will now be described with reference to FIG. 9.

The threshold value for performing handover due to overcrowded femto BSs and the ratio of close neighboring femto cells among the neighboring femto cells are compared (S901). Here, the threshold value compared with the ratio of the close neighboring femto cells among the neighboring femto cells is called a handover threshold value.

If the radio (Rcs) of the close neighboring femto cells is larger than the handover threshold value (ThRc) (Rcs>ThRc), the BS of the serving femto cell requests handover to a BS of a target cell 1 (S902). Here, when requesting the handover, a response as to whether QoS is satisfied for the corresponding UE may be also requested.

The target cell 1 may be determined by a reference such as whether it is closest to the UE, whether it has the strongest reference signal, it is a neighboring femto cell reported as a close neighboring femto cell of the UE, and the like.

The BS of the target cell 1 may determine that the QoS between the target cell 1 and the UE is not satisfied (S903). In this case, the BS of the target cell 1 may inform the BS of the serving femto cell that handover preparation has failed (S904).

Then, the BS of the serving femto cell requests handover to a BS of a target cell 2, another target cell, and a response with respect to QoS (S905).

When the target cell 2 and the QoS of the UE are satisfied by more than a certain level (S906), the target cell 2 transmits a response accepting the handover request with respect to the corresponding UE to the BS of the serving femto cell (S907).

Then, the BS of the serving femto cell commands the UE to perform handover to the target cell 2 (S908).

The UE performs handover to the target cell 2 (S909). When the UE is successfully performs handover to the target cell 2, the BS of the serving femto cell may retrieve radio resource it has allocated to the UE to reduce the radio resource in service in the serving femto cell (S910).

However, the BS may increase the use of the radio resource again or operate in an active mode according to a change in a traffic situation in an adjacent neighboring femto cell and in its area. In this case, the BS may provide a service to the UE again through handover.

When a new UE appears in the area of the BS in an idle mode and requests a service, when a UE which has been handed over because of an increase in traffic of a neighboring femto cell is to be handed over to the BS of the previous serving femto cell because its QoS is not guaranteed, or when a neighboring femto fails to guarantee QoS for a UE within its coverage, so it is changed to an active mode according to a request from a neighboring femto cell, the BS is changed to the active mode from the idle mode.

Here, the neighboring femto cell may be a target cell to which the serving femto cell has been attempted handover. Also, in this case, the serving femto cell receives a UE that it has handed over, through handover.

Figure 10:
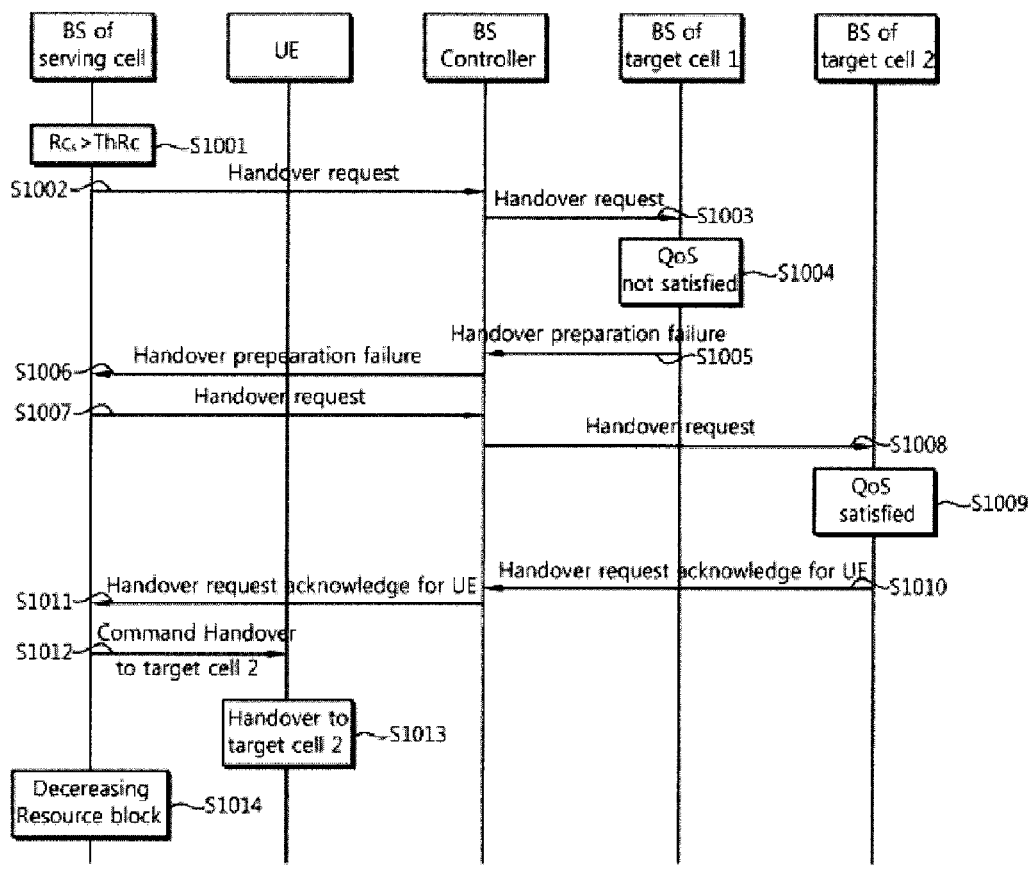
FIG. 10 illustrates the process of performing handover according to another exemplary embodiment of the present invention.

FIG. 10 illustrates the process of performing handover according to another exemplary embodiment of the present invention.

The process of performing handover by a BS and a UE through a controller such as a base station controller (BSC) or a network controller will now be described with reference to FIG. 10. Here, the BSC may be a general RNC, or if the BS is a femto BS, the BSC may be an FNC.

The BS of the serving femto cell compares the ratio of the close neighboring femto cell among the neighboring femto cells as described above and the handover threshold value to check whether it is larger than the handover threshold value (S1001). If the ratio (Rcs) of the close neighboring femto cells is larger than the handover threshold value (ThRc) (Rcs>ThRc), the BS of the serving femto cell transmits a handover request to the BSC (S1002). In this case, measurement of QoS may be also requested together with the handover request.

Then, the BSC transfers the handover request and the like of the BS of the serving femto cell to the BS of the target cell 1 (S1003). Accordingly, the BS of the target cell 1 may determine that it fails to satisfy QoS for the UE (S1004). Then, the BS of the target cell 1 informs the BSC that handover preparation has failed (S1005), and the BSC informs the BS of the serving femto cell that the handover preparation has failed (S1006).

Then, the BS of the serving femto cell transmits a handover request or the like again to the BSC in order to attempt handover to a different cell (S1007). Then, this time, the BSC transmits the handover request of the BS of the serving femto cell, measurement of QoS, and/or a response request to a BS of a target cell 2 (S1008).

If QoS to be provided to the UE by the target cell 2 is more than a certain level (i.e., is a satisfying level) (S1009), the BS of the target cell 2 transmits a response to the handover request to the BSC (S1010). Then, the BSC informs the BS of the serving femto cell that the handover request to the target cell 2 has been accepted (S1011).

Upon receiving the response to the handover request from the BS of the target cell 2, the BS of the serving femto cell commands the UE to perform handover to the target cell 2 (S1012). Then, the UE performs handover to the target cell 2 (S1013), and if the UE's handover is successful, the BS of the serving femto cell stops the use of the radio resource it has allocated to the corresponding UE, thus reducing the radio resource which has been used in the serving femto cell (S1014).

Figure 11:
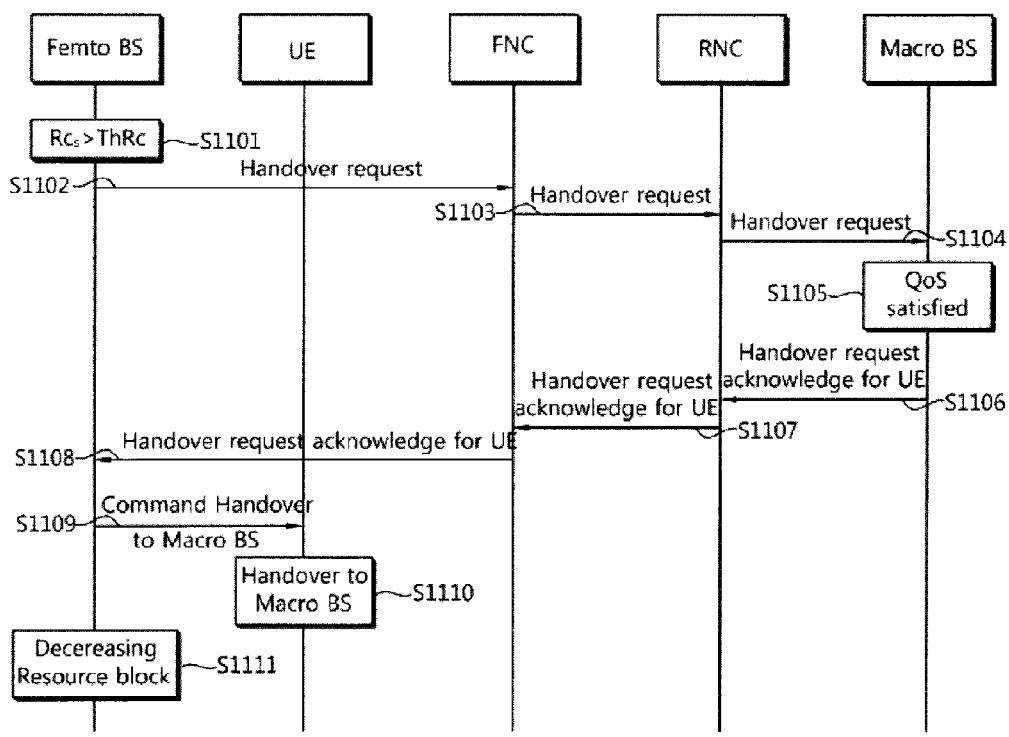
FIG. 11 illustrates the process of performing handover according to another exemplary embodiment of the present invention.

FIG. 11 illustrates the process of performing handover according to another exemplary embodiment of the present invention. A method of performing handover by way of the FNC and the RNC in case where the serving femto cell is a femto cell BS and the target cell is a macro BS will now be described with reference to FIG. 11.

The BS of the serving femto cell compares the ratio of the close neighboring femto cell among the neighboring femto cells as described above and the handover threshold value to check whether it is larger than the handover threshold value (S1101). If the ratio (Rcs) of the close neighboring femto cells is larger than the handover threshold value (ThRc) (Rcs>ThRc), the BS of the serving femto cell transmits a handover request to the FNC (S1102). Then, the FNC transfers the handover request to the RNC (S1103), and the RNC transfers the handover request to the BS of the target cell, i.e., the macro BS (S1104).

Upon receiving the handover request from the femto BS, if QoS of more than a certain level is satisfied for the UE (S1105), the BS of the target cell transmits a response for accepting the handover request to the RNC (S1106). Then, the RNC transfers the handover response of the BS of the target cell to the FNC (S1107), and the FNC transfers the same to the femto BS, i.e., the BS of the serving femto cell (S1108).

Upon receiving the handover response, the BS of the serving femto cell commands the UE to perform handover to the target cell (S1109). Then, the UE performs handover to the macro BS, the BS of the target cell (S1110). Likewise the case described above with reference to FIG. 9 or 10, if the UE successfully performs handover to the target cell, the BS may retrieve the radio resource it has allocated to the UE to thus reduce the radio resource in service in the serving femto cell (S1111).

Figure 12:
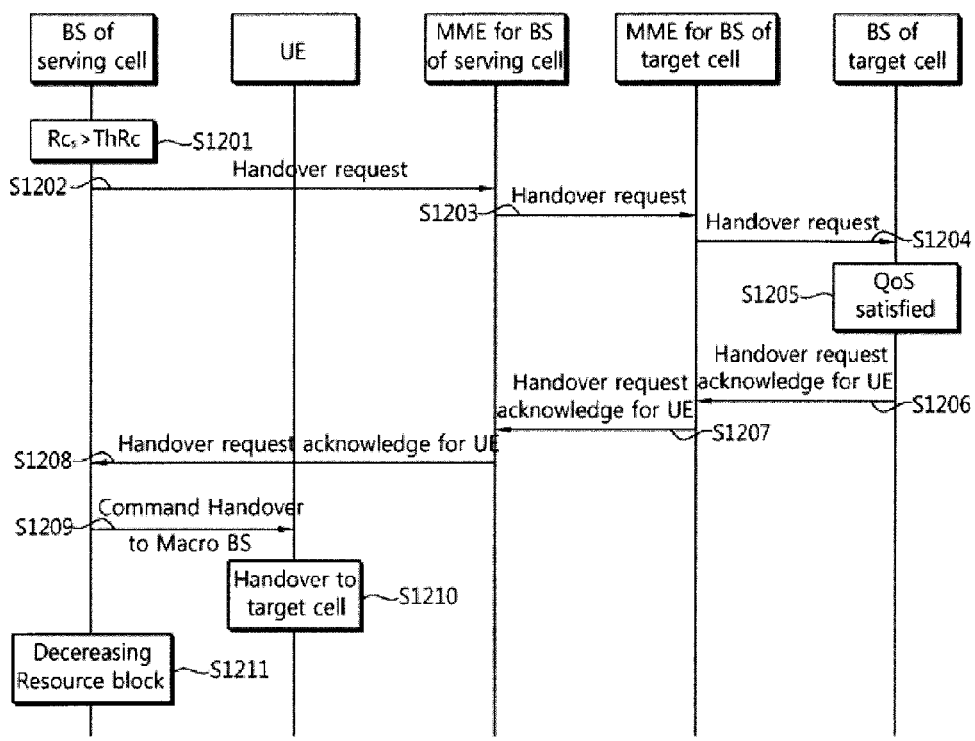
FIG. 12 illustrates the process of performing handover according to another exemplary embodiment of the present invention.

FIG. 12 illustrates the process of performing handover according to another exemplary embodiment of the present invention. The process of performing handover via the MME will now be described with reference to FIG. 12. Here, the case where one of the serving femto cell and the target cell is a femto cell, so the MME for the BS of the serving femto cell and that for the BS of the target cell are different, one of the two MMEs is an MME for the BS of the femto cell and the other is an MME for the macro BS will be taken as an example in the following description.

The BS of the serving femto cell compares the ratio of the close neighboring femto cell among the neighboring femto cells as described above and the handover threshold value to check whether it is larger than the handover threshold value (S1201). If the ratio (Rcs) of the close neighboring femto cells is larger than the handover threshold value (ThRc) (Rcs>ThRc), the BS of the serving femto cell requests handover of the corresponding UE from the MME (referred to as 'MME1', hereinafter) for the BS of the serving femto cell (S1202).

Then, the MME1 transfers the handover request to the MME (referred to as 'MME2', hereinafter) for the BS of the target cell (S1203), and the MME2 transfers the handover request to the BS of the target cell (S1204). Here, the serving femto cell may be a femto cell, the BS of the serving femto cell may be a femto cell BS, the MME1 may be an MME for the femto cell BS. The target cell may be a general macro cell, the BS of the target cell may be a macro BS, and the MME2 may be an MME for the macro BS.

Upon receiving the handover request, if QoS of more than a certain level is satisfied for the UE (S1205), the BS of the target cell transmits a response for accepting the handover request to the MME2 (S1206). Then, the MME2 transfers the handover response of the BS of the target cell to the MME1 (S1207), and the MME1 transfers it to the BS of the serving femto cell (S1208).

Upon receiving the handover response, the BS of the serving femto cell commands the UE to perform handover to the target cell (S1209). Then, the UE performs handover to the macro BS, the BS of the target cell (S1210).

Likewise as described above with reference to FIGS. 9 to 11, when the UE successfully perform handover to the target cell, the BS retrieves the radio resource it has allocated to the UE and reduce the radio resource in service in the serving femto cell (S1211).

FIG. 13 illustrates a resource reducing method of a femto cell according to one exemplary embodiment of the present invention. As shown in FIG. 13, in the radio resource reducing method of a femto cell according to ah exemplary embodiment of the present invention, when neighboring femto cell are closely located near a particular femto cell, the particular femto cell reduces radio resource, namely, to a particular portion ($F_{reserved}$) of a frequency domain, to thus prevent interference with the neighboring femto cells. To this end, the particular femto cell makes UEs within its coverage performs handover to the macro BS or the neighboring femto cells. And the particular femto cell allocates the particular portion ($F_{reserved}$) to a UE of the particular area that cannot perform handover.

Providing a service by using the frequency of the particular portion is defined as a minimal active mode of the femto cell. The frequency of the particular portion is defined as the $f_{reserved}$. Meanwhile, providing a service by the particular femto cell by using a portion ($F_{active}$) of radio resource allocated to the particular femto cell is defined as an active mode. The frequency ($f_{reserved}$) of the particular portion generally refers to a frequency space of a very limited small band compared with the most area ($F_{active}$) that can be used by the particular femto cell in the active mode.

With reference to FIG. 13(a), a plurality of femto cells (1301, 1302, 1303, 1304, 1305, 1306, 1307, 1308) are shown.

As described above, a BS of the sixth femto cell 1306 among the plurality of femto cells receives the measurement results, e.g., the cell measurement result with respect to neighboring femto cells, an SINR, a CQI, and an SRS, from the UE.

The BS of the sixth femto cell 1306 determines whether or not neighboring femto cells are closely located nearby based on the received measurement results. For example, as shown in FIG. 8, if the ratio of the close neighboring cells to the entire neighboring cells exceeds the threshold value, the BS of the femto cell 1306 may determine that neighboring femto cells are closely located nearby. In this case, as to whether or not a candidate cell is a neighboring femto cell, if a value (Mni+α) obtained by adding an offset value to a reference signal strength of the candidate femto cell is larger than a threshold value, the candidate femto cell is determined as a neighboring femto cell.

Whether or not the neighboring femto cells are closely located nearby may be determined by the case where a channel state of the UE is aggravated by more than a preset threshold value according to the received measurement result.

When it is determined that the neighboring femto cells are closely located nearby, a BS of the sixth femto cell 1306 makes one or more UEs connected to the BS itself hand over to a target cell according to the method as shown in FIGS. 9 to 12.

If a channel state of a UE which has not handed over to the target cell but remains is smaller than the pre-set threshold value, the BS of the sixth femto cell 1306 allocates radio resource ($F_{reserved}$) of the particular portion as shown in FIG. 13(b) to the remaining UE to provide a service.

As shown in FIG. 13(b), the radio resource of the particular portion ($F_{reserved}$) is a small radio resource among the entire radio resources allocated to the BS of the sixth femto cell 1306. The radio resource of the particular portion is illustrated to exist at the right side of a frequency axis, but the radio resource of the particular portion may exist at an arbitrary position. The size of the band of the radio resource of the particular portion may be changed by the BS of the sixth femto cell 1306 or the BSC.

As described above, the minimal mode operation of the femto cell is very effective for reducing interference with neighboring femto cells while providing a service to a UE, e.g., the UE that does not perform handover. In addition, the minimal mode makes the femto cell quickly changed to the active mode. In other words, a UE could quickly recognize a femto cell which operates in the minimal mode because the femto cell periodically transmits a signal using a minimal resource. Thus, if there is a UE that is to perform handover to a femto operating in the minimal mode, the femto cell is quickly changed to the active mode and an access delay time of the UE is reduced.

Meanwhile, if an adjacent femto cell, e.g., an eighth femto cell 1308, as well as the sixth femto cell 1306, also operates in the minimal mode by reducing its radio resource to a radio resource of the particular portion ($F_{reserved}$), interference may be generated. A solution to this problem is illustrated in FIG. 14.

Figure 14:
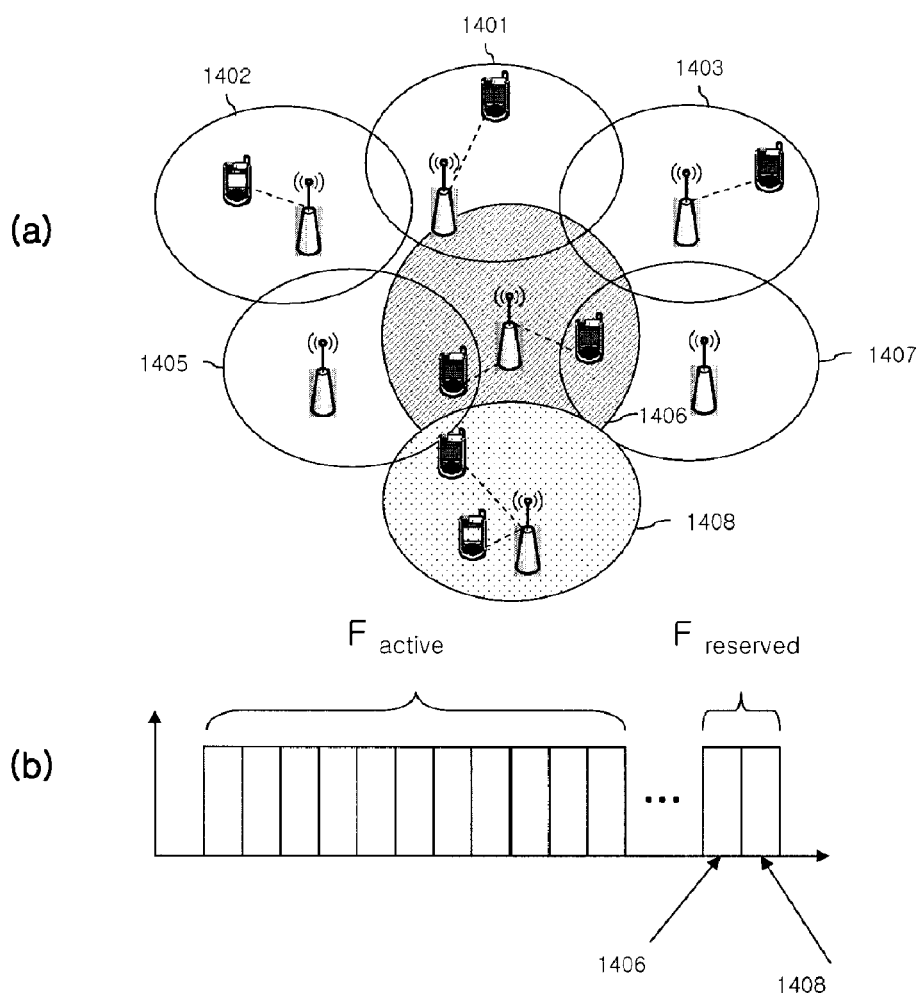
FIG. 14 illustrates a resource reducing method of a femto cell according to another exemplary embodiment of the present invention.

FIG. 14 illustrates a resource reducing method of a femto cell according to another exemplary embodiment of the present invention.

With reference to FIG. 14(a), a method for avoiding interference that can be generated when a plurality of femto cells operate in the minimal mode is shown. For example, in a state that a sixth femto cell 1406 operates with a radio resource of the particular portion ($F_{reserved}$), if an adjacent eighth femto cell 1408 determines that a neighboring femto cell is closely located so it operates in the minimal mode, namely, it operates with the radio resource of the particular portion ($F_{reserved}$), interference may be generated.

To solve this problem, in the present invention, the radio resource of the particular portion ($F_{reserved}$) is frequency-divided. A detailed operation is as follows. Here, the particular portion (Freserved) can be divided into the proper number of portion. Hereinbelow, it will be exemplary explained that the particular portion ($F_{reserved}$) is divided into two portions.

When the sixth femto cell 1406 operates in the minimal mode, it selects a first portion ($f1_{reserved}$) 1406 of the particular portion ($F_{reserved}$) and provides a service by using the first area.

Meanwhile, if the eighth femto cell 1408 operates in the minimal mode, it selects the first portion ($f1_{reserved}$) 1406 of the particular portion ($F_{reserved}$) and provides a service by using the first region.

Thus, when interference is generated, a UE of the sixth femto cell 1406 or the eighth femto cell 1408 transmits a measurement result message, e.g., CQI, SRS, and the like, to the sixth femto cell 1406 or the eighth femto cell 1408.

The sixth femto cell 1406 or the eighth femto cell 1408 determines whether or not an SINR is lower than a threshold value based on the measurement result message.

If the SINR is lower than the threshold value, so it is determined that the interference is generated therebetween, the sixth femto cell 1406 or the eighth femto cell 1408 receives a reference signal from each other, and recognizes an ID of each other based on the reference signal.

The sixth femto cell 1406 or the eighth femto cell 1408 provides the ID of each other to the FNC or the core network.

When the FNC or the core network determines that the sixth femto cell 1406 or the eighth femto cell 1408 uses the first portion ($f1_{reserved}$) 1406 in the same manner, the FNC or the core network transmits a control command to one of the femto cells, e.g., to the eighth femto cell 1408 to use a second portion ($f2_{reserved}$) 1408. In this case, the FNC or the core network controls such that the sixth femto cell 1406 or the eighth femto cell 1408 operates with the second portion ($f2_{reserved}$) 1408 in the same manner.

Meanwhile, in order to prevent interference from being generated, when the sixth femto cell 1406 or the eighth femto cell 1408 determines to operate in the minimal mode, it may randomly select one of the first and the second portions.

Figure 15:
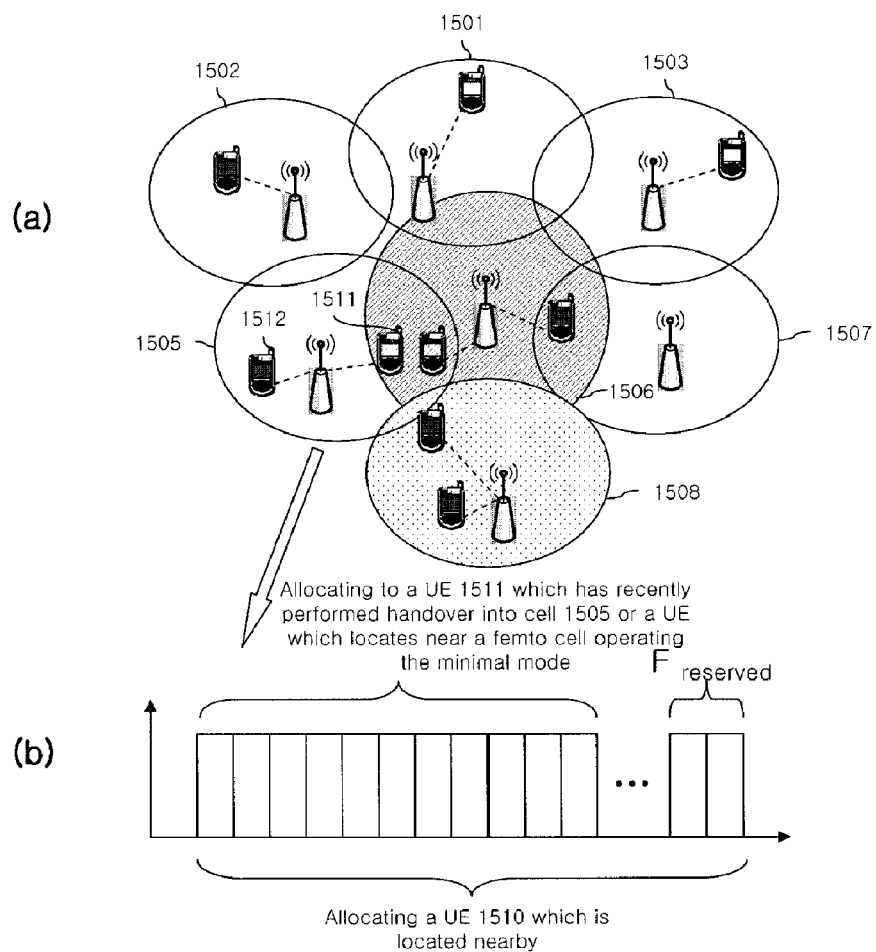
FIG. 15 illustrates a resource management method of a femto cell operating in a minimal mode and neighboring femto cells according to an exemplary embodiment of the present invention.
Figure 16:
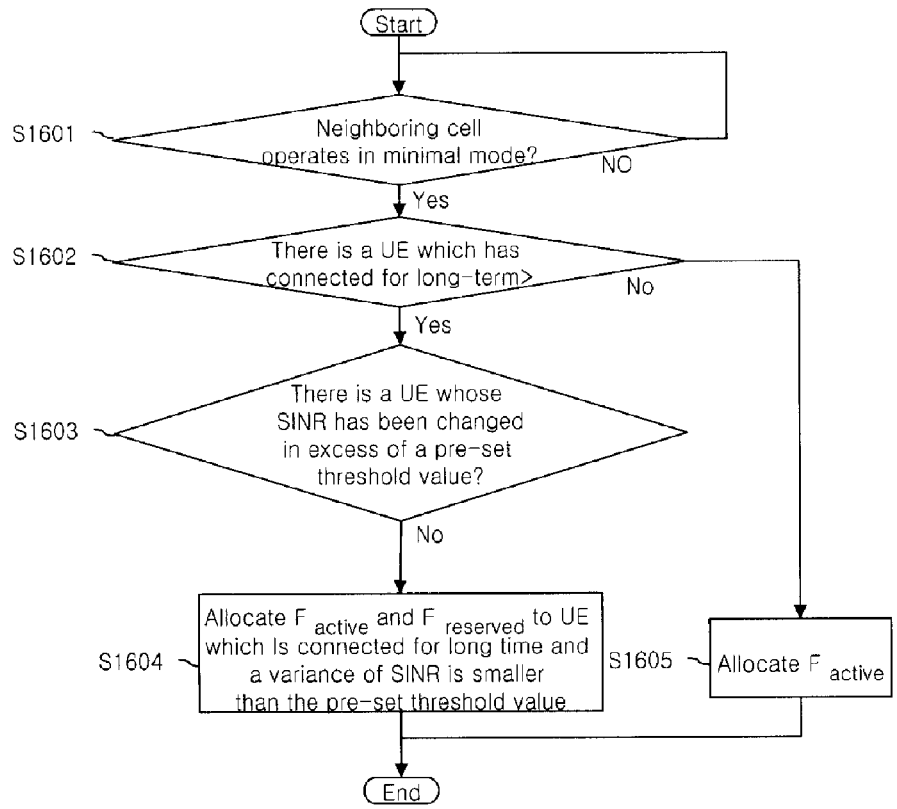
FIG. 16 is a flow chart illustrating the process of the resource management of the femto cell and the neighboring femto cells according to an exemplary embodiment of the present invention.

FIG. 15 illustrates a resource management method of a femto cell operating in a minimal mode and neighboring femto cells according to an exemplary embodiment of the present invention, and FIG. 16 is a flow chart illustrating the process of the resource management of the femto cell and the neighboring femto cells according to an exemplary embodiment of the present invention.

In FIG. 15, a resource management method in a neighboring femto cell, e.g., in a fifth femto cell 1505 when a sixth femto cell 1506 or an eighth femto cell 1508 operates in the minimal mode is shown.

As the sixth femto cell 1506 or the eighth femto cell 1508 operates in the minimal mode, the fifth femto cell 1505 may not use the particular portion ($F_{reserved}$) of its own radio resource in order to avoid interference.

However, if the particular portion ($F_{reserved}$) is not used, the resource is wasted, so a method for effectively using the radio resource is proposed as shown in FIG. 15.

For example, if the fifth femto cell 1505 allocates the particular portion ($F_{reserved}$) to a first UE 1511 or a UE which locates near a femto cell operating the minimal mode among the connected UEs and provides a service, an interference is generated with the sixth femto cell 1506 or the eighth femto cell 1508. However, as illustrated, although the fifth femto cell 1505 allocates the particular portion ($F_{reserved}$) to the second UE 1512 among the connected UEs and provides a service, an interference is not generated with the sixth femto cell 1506 or the eighth femto cell 1508. This is because the second UE 1512 is located to be very close to the fifth femto cell 1505, but it is sufficiently away from the sixth femto cell 1506 or the eighth femto cell 1508, so there is little interference. In other words, the second UE 1512 is located to be very close to the fifth femto cell 1505, it can transmit/receive a signal with small power, without causing an interference to the sixth femto cell 1506 or the eighth femto cell 1508.

A detailed operation is as follows.

The fifth femto cell 1505 determines whether or not the neighboring cell operates in the minimal mode (S1601). The determination may be made based on a measurement result, e.g., a neighboring cell measurement result, received from a UE within the fifth femto cell 1505. Of the determination may be made based on a center frequency of a neighboring femto cell listened to by the fifth femto cell 1505. Or the determination may be made based on information about a neighboring femto cell received by the fifth femto cell 1505 from the FNC.

When the neighboring cell operates in the minimal mode, the fifth femto cell 1505 determines whether there is a UE which has been connected to the fifth femto cell 1505 for a long time, e.g., for more than a pre-set time (S1602).

The fifth femto cell 1505 determines whether there is a UE whose SINR increases or decreases in excess of a pre-set threshold value among the UEs which have been connected for a long time (S1603). Here, if the size of the change in the SINR does not exceed the threshold value, it means that when the sixth femto cell 1506 or the eighth femto cell 1508 was operating in the active mode, the UE was located to be close to the fifth femto cell 1505 such that it was not interfered with or an influence of an interference was so small.

The fifth femto cell 1505 determines that the UE, e.g., the second UE 1512, whose SINR increases or decreases in excess of the pre-set threshold value, among the UEs which have been connected for a long time is located to be very close to the fifth femto cell 1505 but sufficiently away from the sixth femto cell 1506 or the eighth femto cell 1508, and allocates the entire radio resource, namely, $F_{active}$ and $F_{reserved}$, to the second UE 1512 to provide a service (S1604).

Meanwhile, the fifth femto cell 1505 allocates the radio resource, i.e., Factive, for the active mode to a UE which has not been connected for a long time and a UE whose SINR increases or decreases in excess of the pre-set threshold value, and provides a service. Here, the UE which has not been connected for a long time may have lately performed handover to the fifth femto cell 1505 or may be located to be close to the sixth femto cell 1506 or the eighth femto cell 1508. Thus, if the radio resource $F_{reserved}$ is allocated to the UE which has not been connected for a long time, an interference would be possibly generated with the sixth femto cell 1506 or the eighth femto cell 1508. Thus, in order to avoid this problem, the fifth femto cell 1505 allocates the radio resource, i.e., $F_{active}$, for the active mode. In addition, if a UE has the SINR that has been increased to exceed the pre-set threshold value, it means that the UE was interfered with by a neighboring femto cell when the neighboring femto cell, which has been currently changed to the minimal operation mode, was operating in the active mode. So, the UE is considered to be located at a short distance from the neighboring femto cell, and in this state, if the fifth femto cell 1505 allocates the particular portion ($f_{reserved}$) the UE, an interference may be generated with the femto cell. Namely, the UE whose SINR has been increased to exceed the pre-set threshold value was interfered with by the neighboring femto cell when the neighboring femto cell was operating in the active mode, to end in having a low SINR value, and as the neighboring femto cell was changed to the minimal operation mode, the interference was reduced.

Meanwhile, the fifth femto cell 1505 allocates the radio resource, i.e., Factive, for the active mode to the UE whose SINR increases in excess of the pre-set threshold value, and when the SINR value of the UE increases further with the lapse of a certain time, the fifth femto cell 1505 permits the UE to use the particular portion ($f_{reserved}$). The reason is because, the fact that the SINR of the UE increases means that the UE has been moved to a location close to the fifth femto cell 1505, so the interference with the neighboring femto cell has been considerably reduced.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor such as a microprocessor, a controller, a microcontroller an application specific integrated circuit (ASIC).

Figure 17:
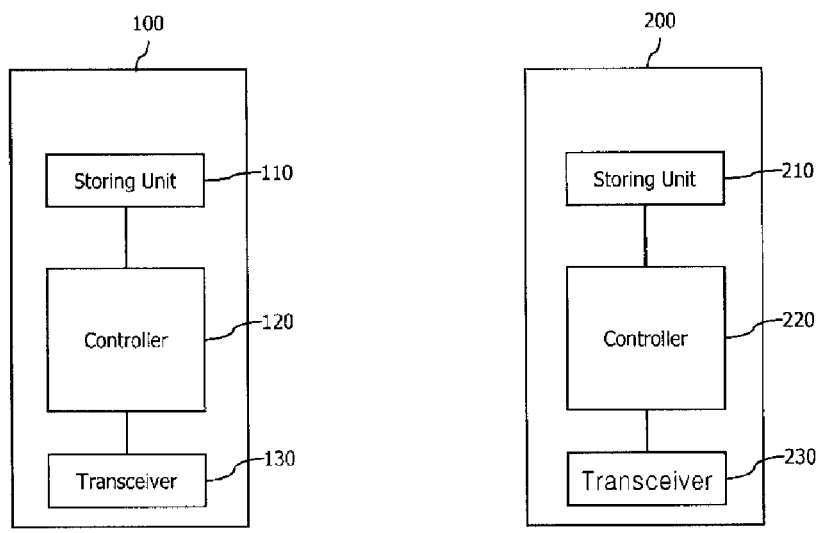
FIG. 17 is a schematic block diagram of a UE 100 and a femto base station 200 according to an exemplary embodiment of the present invention.

FIG. 17 is a schematic block diagram of a UE 100 and a femto base station 200 according to an exemplary embodiment of the present invention.

As shown in FIG. 17, the terminal includes a storage unit 110, a controller 120, and a transmission/reception unit 130. The femto BS 220 includes a storage unit 210, a controller 220, and a transmission/reception unit 230.

The storage units 110 and 220 store the methods illustrated in FIGS. 7 to 16.

The controllers 120 and 220 control the storage units 110 and 210 and the transmission/reception units 130 and 230. In detail, the controllers 120 and 220 execute the methods stored in the storage units 110 and 210. Also, the controllers 120 and 220 transmit the above-mentioned signals via the transmission/reception units 130 and 230.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for managing a pre-set radio resource of a femto cell, the method comprising:
    providing a service to one or more user equipments (UEs) by using a portion of the preset radio resource;
    receiving measurement results from the one or more UEs;
    determining whether one or more neighbor femto cells are located nearby based on the measurement results;
    reducing the pre-set radio resource to a small radio resource and providing the service with the small radio resource if it is determined that one or more neighbor femto cells are located nearby; and
    increasing the small radio resource to the pre-set radio resource to provide the service if interference with the one or more nearby neighbor femto cells is reduced,
    wherein increasing the small radio resource comprises:
    determining whether there are UEs that have been connected for more than a pre-set time period in the femto cell; and
    providing a service to a UE among the UEs that have been connected for more than the pre-set time period whose signal-to-noise interference noise ratio (SINR) does not increase or decrease in excess of a threshold value by using the entire pre-set radio resource.

2. The method of claim 1, wherein the measurement results comprise at least cell measurement results with respect to the nearby neighbor femto cells, SINR, channel quality indicator (CQI) or a sounding reference signal (SRS).

3. The method of claim 1, wherein determining whether one or more neighbor femto cells are located nearby comprises determining that a channel state of at least one of the one or more UEs becomes worse than a pre-set threshold value.

4. The method of claim 1, wherein determining whether one or more neighbor femto cells are located nearby comprises:
    determining if a ratio of neighboring femto cells to total number of femto cells exceeds a pre-set threshold value.

5. The method of claim 1, wherein reducing the radio resource comprises:
    handing over at least one of the one or more UEs to one of the one of more neighbor femto cells.

6. The method of claim 1, wherein reducing the pre-set radio resource comprises:
    providing the service via a first resource among the small radio resource; and
    providing the service via a second radio resource among the small radio resource if the first radio resource is interfered with by a neighboring cell.

7. The method of claim 1, wherein the increasing the small radio resource further comprises:
    determining whether there is a UE among the UEs that have been connected for more than the pre-set time period whose SINR increases or decreases in excess of a pre-set threshold value.

8. The method of claim 7, further comprising:
    providing a service to at least UE that has not been connected for more than the pre-set time period or at least one UE whose SINR increases or decreases in excess of the threshold value by using the small radio resource.

9. A method for managing a pre-set radio resource of a femto cell, the method comprising:
    determining whether there are user equipments (UEs) that have been connected for more than a pre-set time period in the femto cell if a neighboring cell operates in a minimal mode;
    determining whether there is a UE whose signal-to-interference noise ratio (SINR) increases or decreases in excess of a pre-set threshold value among the UEs that have been connected for more than the time period; and
    providing a service to a UE whose SINR does not increase or decrease in excess of the threshold value among the UEs that have been connected for more than the time period by using the entire pre-set radio resource.

10. The method of claim 9, further comprising:
    providing a service to at least one UE that has not been connected for more than the pre-set time period or at least one UE whose SINR increases or decreases in excess of the pre-set threshold value by using a small radio resource among the pre-set radio resource.

11. The method of claim 9, wherein further comprising determining the SINR by receiving at least a channel quality indicator (CQI) or a sounding reference signal (SRS).

12. The method of claim 9, further comprising:
providing a service to a UE that has recently performed handover to the femto cell by using a portion of the pre-set radio resource.

13. The method of claim 9, further comprising confirming whether the neighboring cell operates in the minimal mode via a cell measurement result with respect to a neighboring cell received from a UE.

* * * * *